US009042908B2

(12) United States Patent
Dai et al.

(10) Patent No.: US 9,042,908 B2
(45) Date of Patent: May 26, 2015

(54) IDENTIFYING PURPOSE-BASED ORIGIN-DESTINATION USING CALL DETAILED RECORDS

(75) Inventors: Jing Dai, White Plains, NY (US); Ming Li, Elmsford, NY (US); Pavankumar Murali, Haverstraw, NY (US); Milind R. Naphade, Fishkill, NY (US); Sambit Sahu, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 13/467,035

(22) Filed: May 8, 2012

(65) Prior Publication Data

US 2013/0304363 A1    Nov. 14, 2013

(51) Int. Cl.
*H04W 24/00* (2009.01)
*G08G 1/01* (2006.01)
*H04M 15/00* (2006.01)

(52) U.S. Cl.
CPC ............... *G08G 1/012* (2013.01); *H04M 15/58* (2013.01)

(58) Field of Classification Search
CPC .................................................. H04W 64/00
See application file for complete search history.

(56) References Cited

U.S. PATENT DOCUMENTS

| 8,340,685 | B2 * | 12/2012 | Cochran et al. ............ 455/456.1 |
| 8,509,806 | B2 * | 8/2013 | West et al. ................ 455/456.1 |
| 8,566,030 | B1 * | 10/2013 | Demiryurek et al. ......... 701/426 |
| 2005/0084156 | A1 * | 4/2005 | Das et al. ...................... 382/224 |
| 2007/0106465 | A1 * | 5/2007 | Adam et al. .................. 701/209 |
| 2008/0004789 | A1 * | 1/2008 | Horvitz et al. ................ 701/117 |
| 2008/0046150 | A1 * | 2/2008 | Breed ............................. 701/45 |
| 2011/0172912 | A1 * | 7/2011 | Fukuta et al. ................. 701/207 |
| 2011/0270654 | A1 * | 11/2011 | Banerjee et al. ............. 705/14.4 |
| 2012/0310736 | A1 * | 12/2012 | Vengroff et al. ........... 705/14.53 |
| 2014/0357214 | A1 * | 12/2014 | Czaja et al. ................ 455/404.1 |

* cited by examiner

*Primary Examiner* — Helal A Algahaim
*Assistant Examiner* — Paul Castro
(74) *Attorney, Agent, or Firm* — Louis J. Percello; Otterstedt, Ellenbogen & Kammer, LLP (57) ABSTRACT

Access is obtained to call data records (or other data) for a plurality of mobile telephony users. The call data records (or other data) include location-time sequences. For each of the mobile telephony users, corresponding ones of the location-time sequences are segmented into trips; a home-work-school classification model is used to determine a home location and a work-school location, based on the trips; and a trip purpose classification model is used to assign each of the trips a purpose label, based at least on comparing at least one of a start location and an end location for each one of the trips to at least one of the home location and the work-school location determined using the home-work-school classification model. The trips are aggregated into purpose based origin-destination categories based at least on the purpose labels, time ranges of the location-time sequences, and the start and end locations.

25 Claims, 8 Drawing Sheets

IDENTIFYING PURPOSE-BASED ORIGIN-DESTINATION USING CALL DETAILED RECORDS

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to data mining and the like.

BACKGROUND OF THE INVENTION

Origin-Destination (OD) information is broadly used to describe traffic demand among zones and help transportation planning and operations. OD is usually represented by the number of trips between any pair of regions in a time window. Purpose-based OD indicates the traffic demand of categorized trips, and prioritizes planning and operations for the roost needed groups of residents.

SUMMARY OF THE INVENTION

Principles of the invention provide techniques for identifying purpose-based origin-destination using call detailed records. In one aspect, an exemplary method includes the step of obtaining access to at least one of call data records, location update events, and control events between mobile telephone infrastructure and mobile phones for a plurality of mobile telephony users. The at least one of call data records, location update events, and control events between mobile telephone infrastructure and mobile phones include location-time sequences. Further steps include, for each of the mobile telephony users, segmenting corresponding ones of the location-time sequences into trips: for each of the mobile telephony users, using a home-work-school classification model to determine a home location and a work-school location, based on the trips; for each of the mobile telephony users, using a trip purpose classification model to assign each of the trips a purpose label, based at least on comparing at least one of a start location and an end location for each one of the trips to at least one of the home location and the work-school location determined using the home-work-school classification model; and aggregating the trips into purpose based origin-destination categories based at least on the purpose labels, time ranges of the location-time sequences, and the start and end locations.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

little or no need to rely on self-reporting; and
enhanced accuracy.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

As noted, Origin-Destination (OD) information is broadly used to describe traffic demand among zones and help transportation planning and operations. OD is usually represented by the number of trips between any pair of regions in a time window. Purpose-based OD indicates the traffic demand of categorized trips, and prioritizes planning and operations (e.g., urban planning and traffic operations) for the most needed groups of residents.

An example of such purpose-based categories is Home-Based School (HBS), which refers to the trips from home to school. Knowing the OD of HBS among zones in a city, the transportation agencies can assign buses around school time accordingly, and schedule snow plowing on these roads first after snow happens. Information related to purpose-based OD is usually collected through survey, GPS, or the combination of these two approaches. These methods rely heavily on self reporting. Recently, data mining techniques have been applied to identify the purpose of OD based on mapping destinations to Point of Interests (POI). However, all these methods have very limited coverage and heavily rely on self-reporting or POI (POI are somewhat inaccurate and ambiguous). On the other hand, the availability of Call Detailed Records (CDR) provides broad coverage over mobile subscribers. However, the inaccuracy and low frequency of locations in CDR render the GPS-based approaches incapable of generating reasonable results.

One or more embodiments employ Call Detailed Records (CDR) to infer purposed-based OD, which generates accurate results from the movement of all the cell phone subscribers based on associations among trips, without self-reporting. One or more embodiments provide a scalable solution to automatically determine the detailed demand for transportation based on commonly available devices. Furthermore, one or more embodiments make use of a new dimension; namely, trips are associated and related to behavior patterns. For example, a trip from home to work can never follow another trip from home; and if a trip is from home to work, similar trips should happen multiple times in a week.

FIGS. 1A-1E show a sequence of views of a neighborhood map 102 and a table 104 tabulating the start time (first column), end time (second column), and purpose (third column) for a plurality of trips (each row is a trip). The categories of trips in the non-limiting example include HBW, NHBO, and NHBW (see definitions below).

Figure 1A:
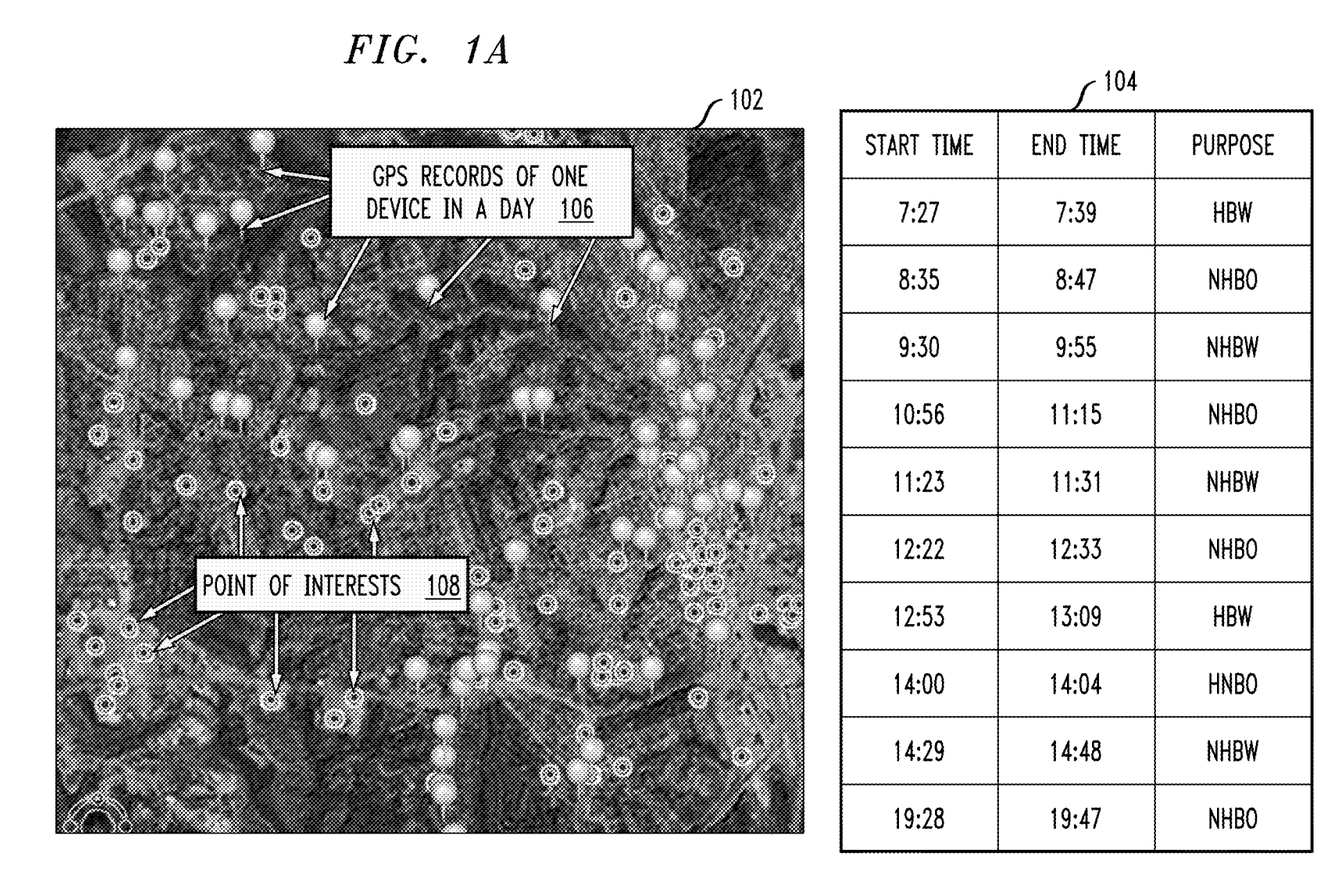
FIGS. 1A-1E show evolution of a map with exemplary trip purposes and a corresponding table.
Figure 1B:
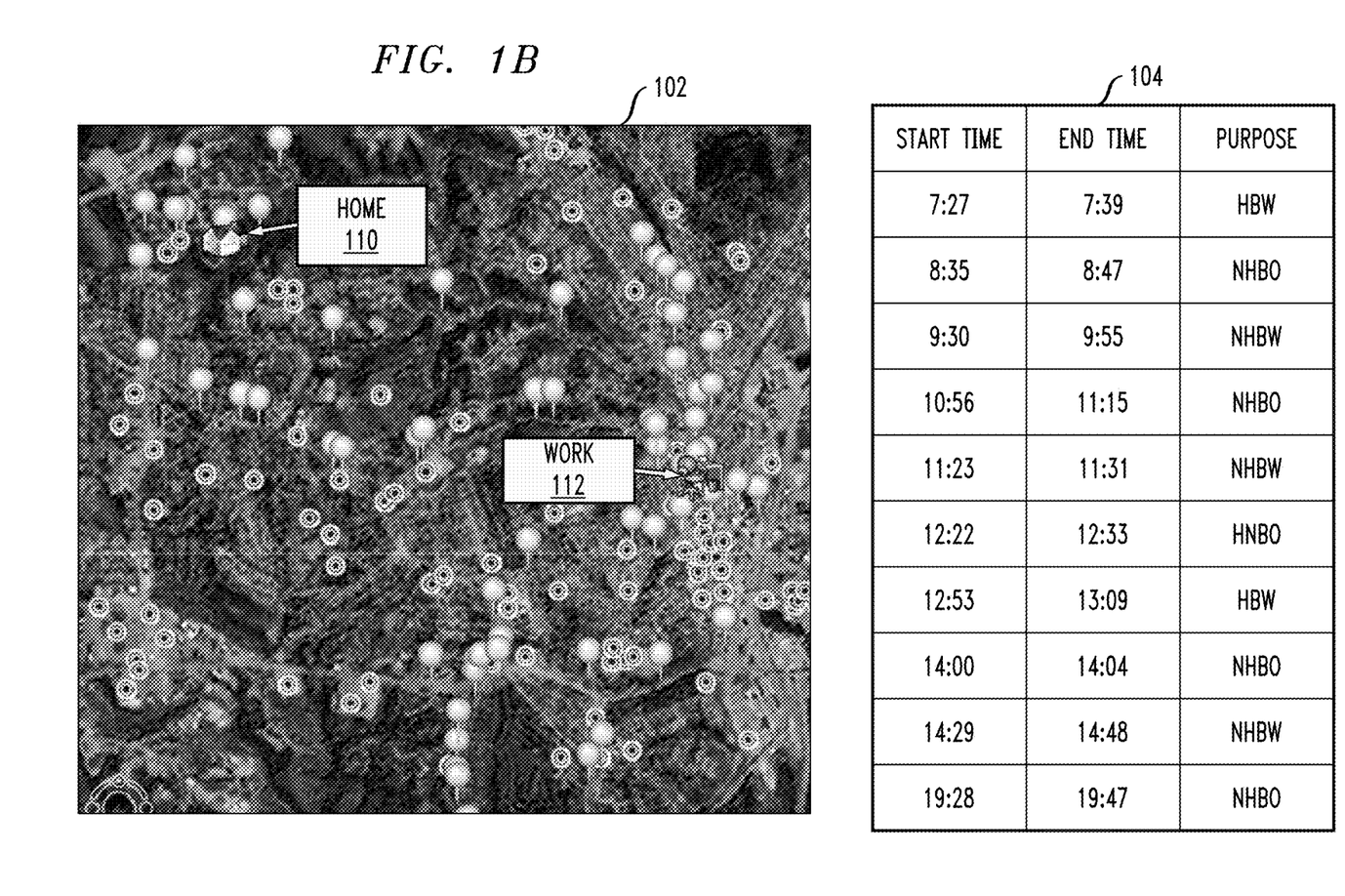
Figure 1C:
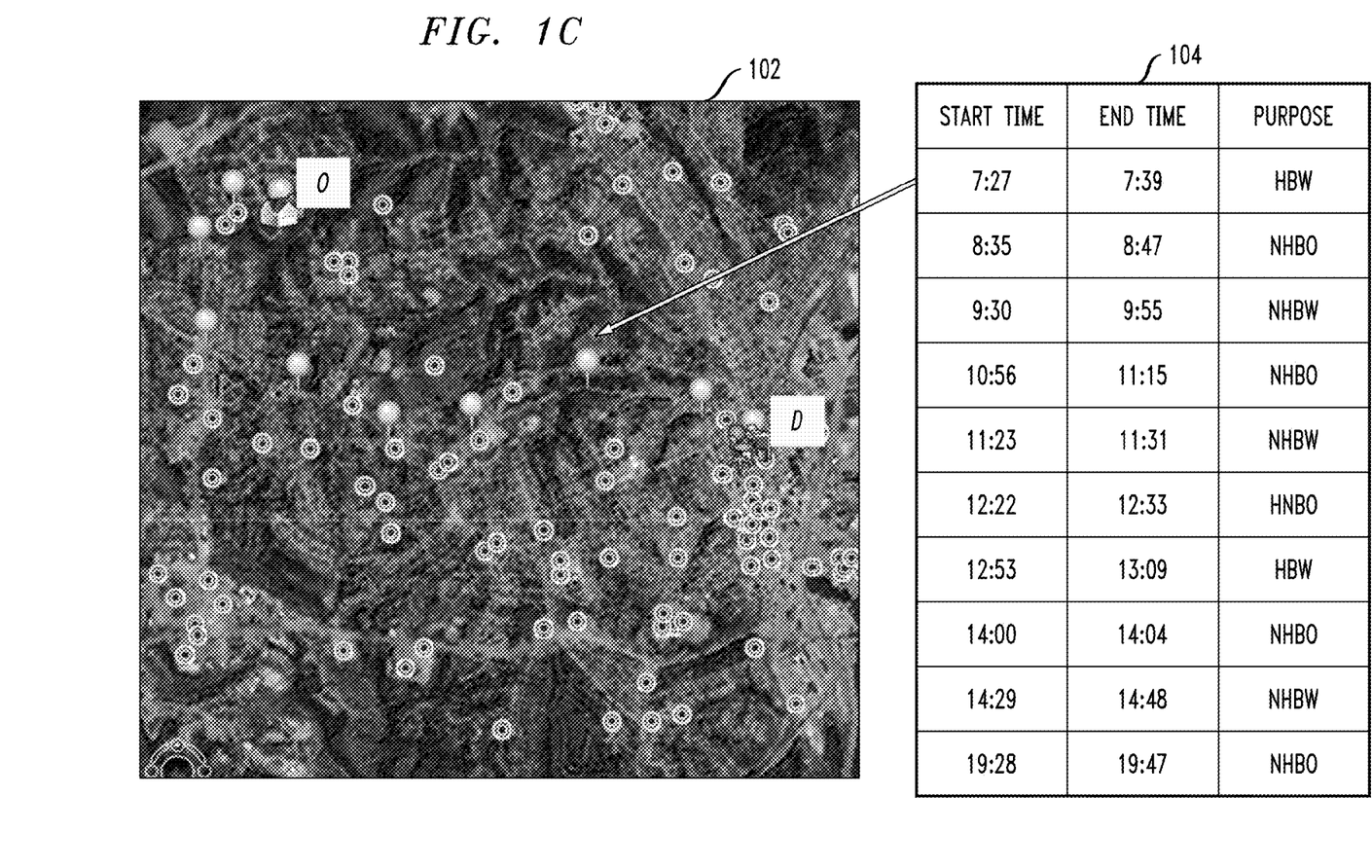
Figure 1D:
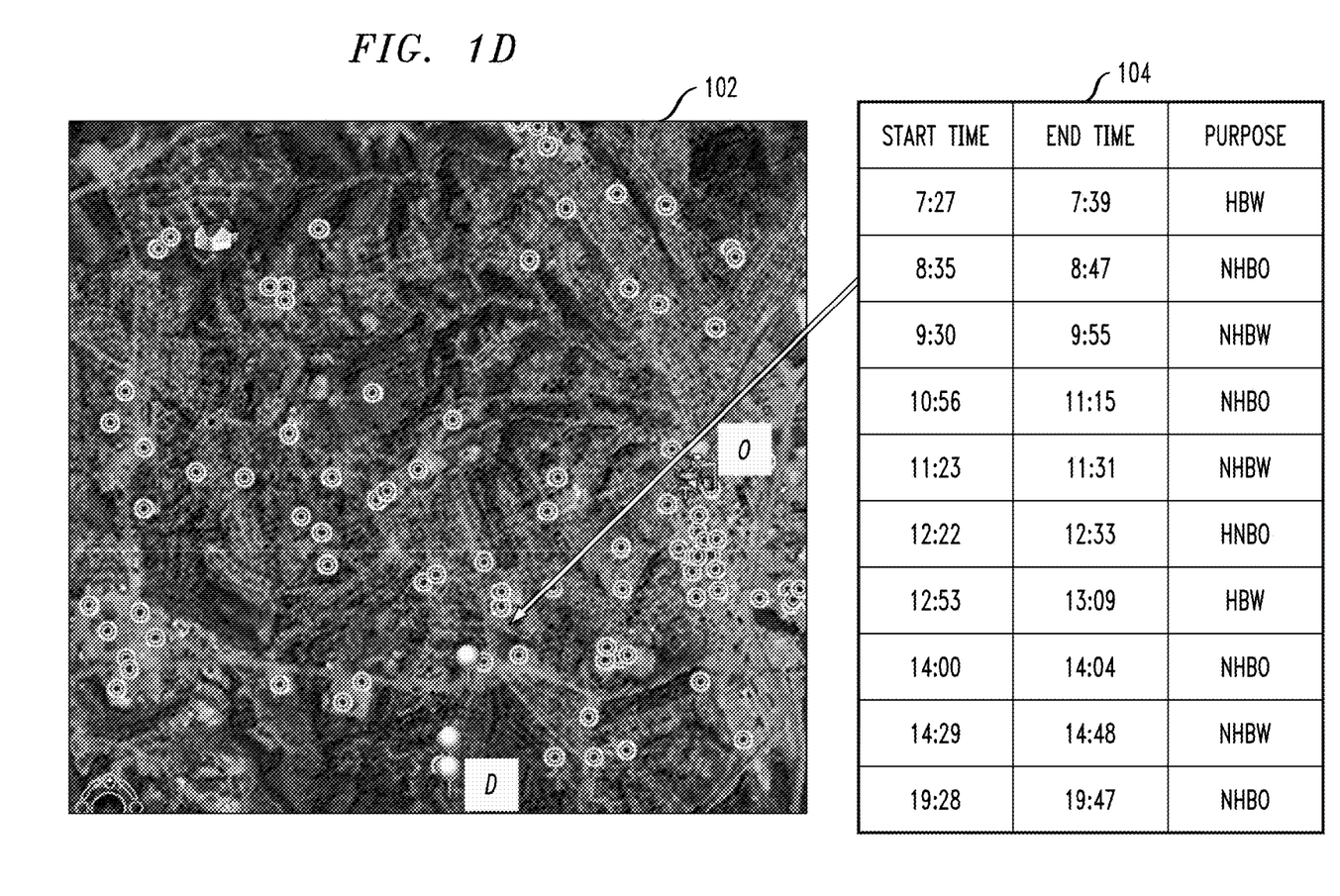
Figure 1E:
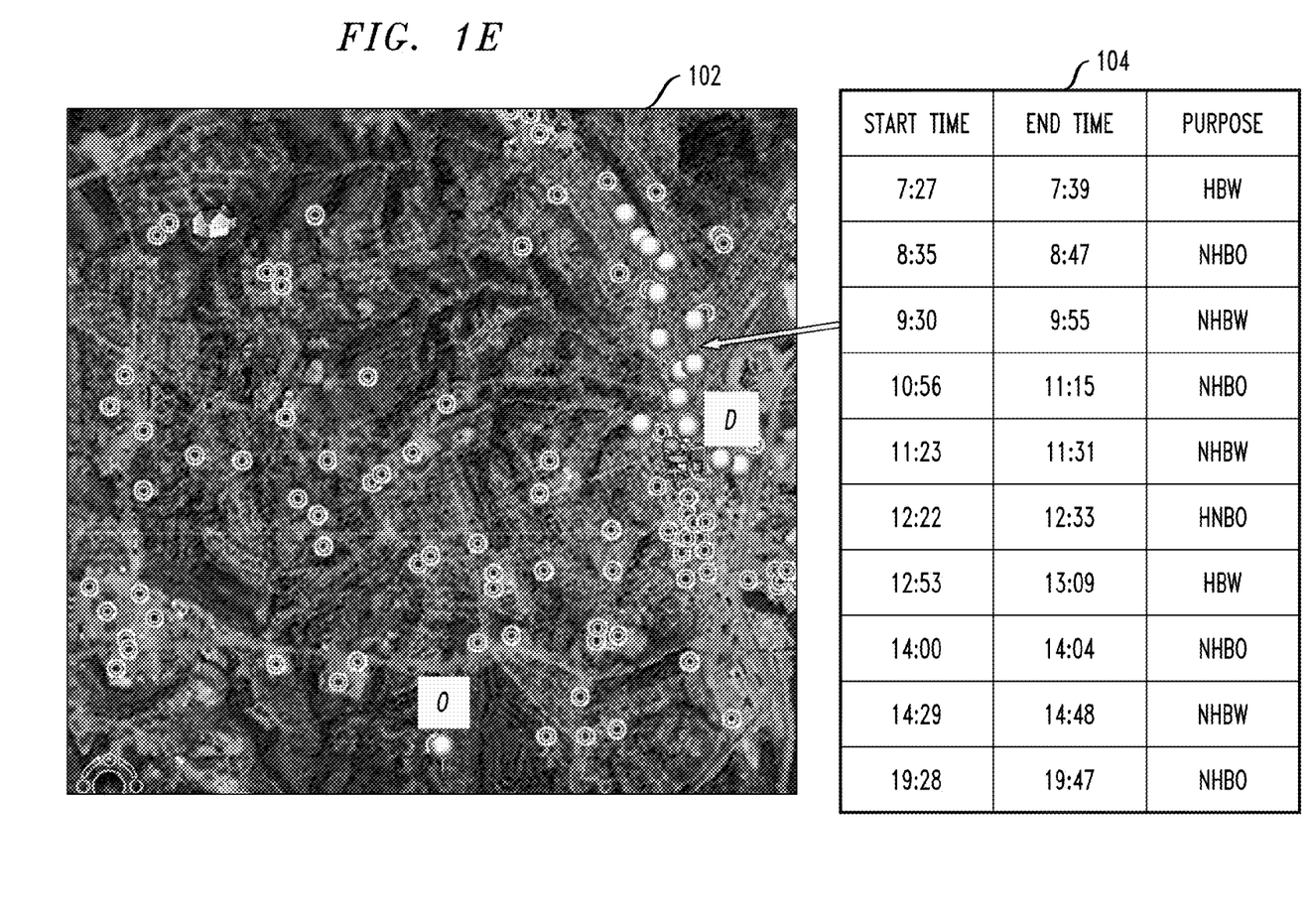

FIG. 1A shows the user's one day global positioning system (GPS) trace and the points of interest (POIs). Symbols 106 represent GPS records of one device in a day, and symbols 108 represent points of interest. Only a few of elements 106, 108 are labeled, to avoid clutter. FIG. 1B shows home and work locations 110, 112 respectively. FIG. 1C shows a home-based-work trip corresponding to the first row of table 104. "O" stands for origin and "D" stands for destination. FIG. 1D shows a non-home-based-other trip corresponding to the second row of table 104. The origin "O" is office, the destination "D" is a meaningful location than home or work. FIG. 1 E shows a non-home-based-work trip corresponding to the third row of table 104. The origin "O" is a meaningful location other than home or work. The destination "D" is work.

One or more embodiments derive purpose-based OD from a large amount of CDR data. The movement patterns are extracted from the location sequences from anonymized CDR data. The process then identifies home locations and work locations for each mobile client, and further infers the purposes of each movement as one of the following eight categories, by analyzing the associations among trips:
1. home-based work (HBW),
2. home-based school (HBS),
3. home-based shopping (HBSH),
4. home-based other (HBO),
5. non-home-based work (NHBW),
6. non-home-based school (NHBS),
7. non-home-based shopping (NHBSH),
8. non-home-based other (NHBO).

One or more embodiments can generate detailed ODs by only accessing CDR data which are available in the telecom industry. End user interaction is not necessary in one or more embodiments. Given that most of the residents have their cell phones on most of the time, using CDR data gives much larger coverage as compared to the traditional self-reporting techniques. Therefore, more accurate results can be achieved rather than mainly relying on guesses or unreliable estimation with a few samples.

Purely by way of a non-limiting example, in one experiment on 5 volunteers over 7 days, 65% accuracy of purpose identification was achieved.

On average, each cell phone can expect roughly 50 records with locations reported to the service provider. Each reported location can either be a triangulated location (50~200 meters error) or the nearest cell tower location. Referring to flow chart 202 of FIG. 2, one or more embodiments include the following steps to generate purpose-based OD:
trip segmentation 208,
home/work/school identification 210,
trip purpose initiation 212,
trip purpose refining 214.
OD aggregation 216.

Figure 2:
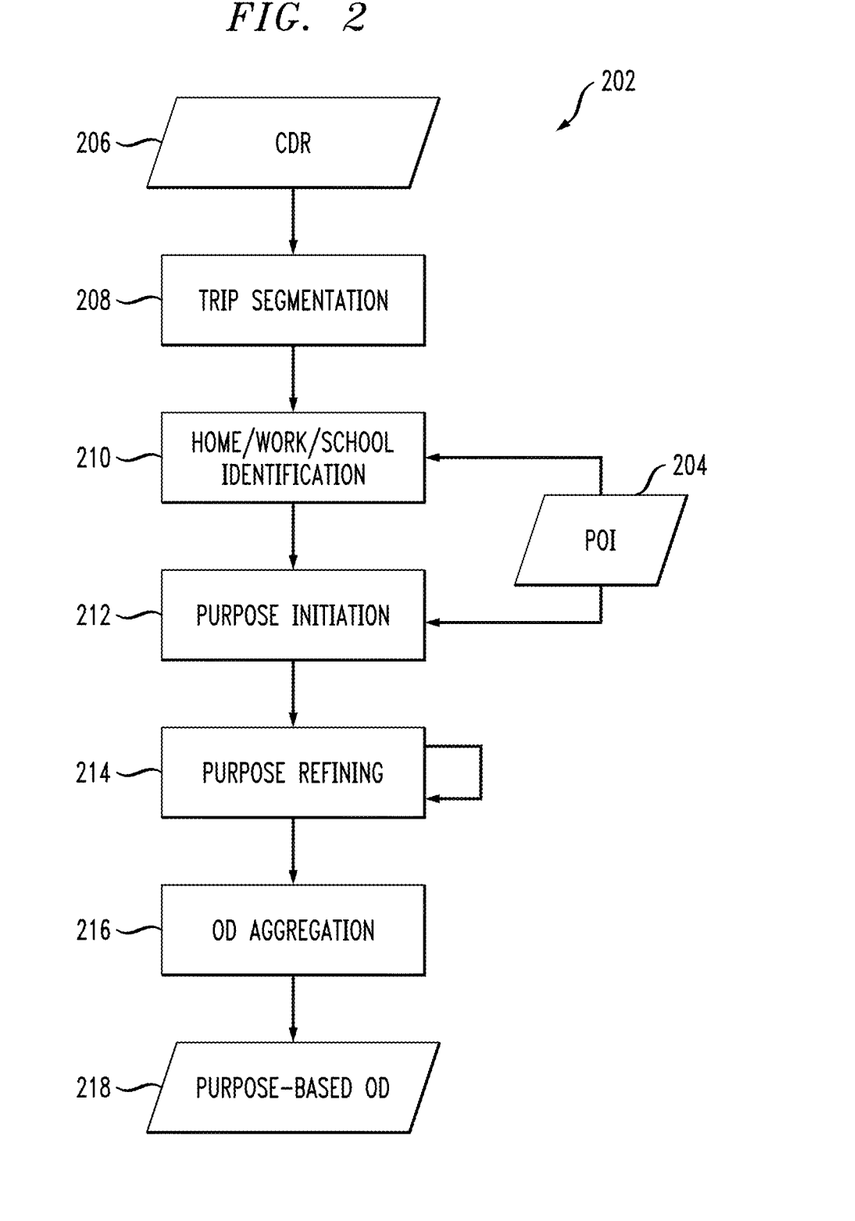
FIG. 2 is a flow chart of exemplary method steps, according to an aspect of the invention.

In trip segmentation step 208, the CDR data 206 of each anonymized user is segmented into trips based on the time duration that the device had been detected in the same area. For instance, if a cell phone had multiple consecutive records within a 500 meters range for longer than 20 minutes, this approach assumes that this user stopped at this location and the last trip had ended. After the trip generation, trips of each user with start time, end time, start location, end location, and stay duration are extracted.

In home/work/school identification step 210, a classification model is built to determine the home location and work/school location of each user based on his or her trips. Such a classification model can be a rule-based model generated based on prior knowledge, such as "people usually stay at home between 1-5 AM," and "people usually stay at work/school locations for at least 4 hours or visit this location at least 3 times during day time." In case that labeled data are available from volunteers, the classification model can be trained by running classification approaches on the labeled data. Examples of such classification methods include decision tree, SVM, or artificial neural network. After the home/work identification, it is possible to determine if a trip started from home and/or ended at work/school, which is a significant step towards purpose identification. Step 210 can make use of POI data 204. From POI data it is known if a location is a residential area, a business district, or a school campus. Therefore. POI data can help in labeling each user's dwelling locations to home, work, and school locations.

Furthermore with regard to step 210, an exemplary rules-based approach could proceed as follows, depending on the specific scenario. For home identification, collect the last GPS record location of every day, and take the median of these locations. For work identification, collect GPS location according to stay time and look for a location with stay time of for example, more than 3 hours and less than 9 hours; or look for a location with more than 3 visits in the same day. Take the median of these locations. For school identification, look for a trip with an end location close to a school or college (e.g., within 120 m). Look for a trip end time between 7:30 AM and 9:30 AM or between 3:00 PM and 6:00 PM. Look for a U turn point close to the school or college (e.g., within 120 m). Look for more than 1 visit in one week. An exemplary data mining approach uses labeled trips to build a classification model with features (e.g., Stay time, Start time, Week day, Number of visits). The classification model can utilize popular classification methods such as SVM, kNN, decision tree, or the like. The model is used to classify locations in unlabeled trips.

In trip purpose initiation step 212, a classification model is created to assign each trip a purpose label based on the trip characteristics, including start time, end time, start location, end location, stay duration, distance between home and start location, distance between work/school and start location, distance between home and end location, distance between work/school and end location, and order of the trip in a day. When labeled trips are not available, a rule-based model can be set up based on prior knowledge and/or POIs 204. One example of such rules is "a trip from home area to work/school area arrived later than 8 am is an HBW, otherwise it is an HBS." When labeled trips are available, the model can be established based on a training process using the labeled trips. Such a classification approach can be implemented using decision tree, SVM, or artificial neural network. After the trip purpose initiation, all the initial trip labels from input CDR data are available.

Furthermore with regard to step 212, an exemplary rules-based approach could proceed as follows, depending on the specific scenario. For determining whether a trip is home based or non-home based, if a trip starts from the home location, then it is home based. For determining whether a trip is a work/school trip, shopping trip, or other trip, if it ends at work or school location, then it is a work or school trip; if it ends at a shopping area, then it is a shopping trip; otherwise it is an "other" trip. An exemplary data mining approach uses labeled trips to build classification model with features (Trip duration time, Start time, Week day. Destination number of visits, Destination stay time. Trip order. Distance of start location to home, Distance of start location to work, Distance of end location to home, Distance of end location to work). In some embodiments, the classification model uses popular classification methods such as SVM, kNN, or decision tree. The model is used to classify purposes of unlabeled trips.

In trip purpose refining step 214, a refined model that considers the associations among trip purposes is generated to revise the initial labels that have low confidence. Prior knowledge such as "a home-based trip must not follow another home-based trip" can be used to re-label trips that have been incorrectly classified. When accurately labeled trips are available, classification methods, such as decision tree, SVM, or artificial neural network, can be used to generate a refined model with two additional trip attributes: previous purpose and next purpose. This model can be used to refine trip purposes iteratively until no significant improvement of confidence can be observed. This iterative aspect is represented by the feedback arrow on the right side of step 214. After this step, all the trip purposes are labeled.

Furthermore with regard to step 214, an exemplary data mining approach uses labeled trips to build a classification model with features (Trip duration time, Start time, Week day, Destination number of visits, Destination stay time, Trip order. Distance of start location to home, Distance of start location to work, Distance of end location to home, Distance of end location to work, Previous trip purpose. Next trip purpose). The classification model can utilize popular classification methods such as SVM, kNN, or decision tree. The model is used iteratively to classify purposes of trips whose initial confidence of purpose identification is low and lower than the confidence of previous and next trips. In one or more embodiments, terminate once improvement of total confidence is less than a threshold.

In one or more embodiments, the next step 216 is to aggregate all the trips to purpose-based ODs 218. By grouping these trips based on the purposes, time ranges, and origin/destination zones, purpose-based OD can be generated.

Figure 3:
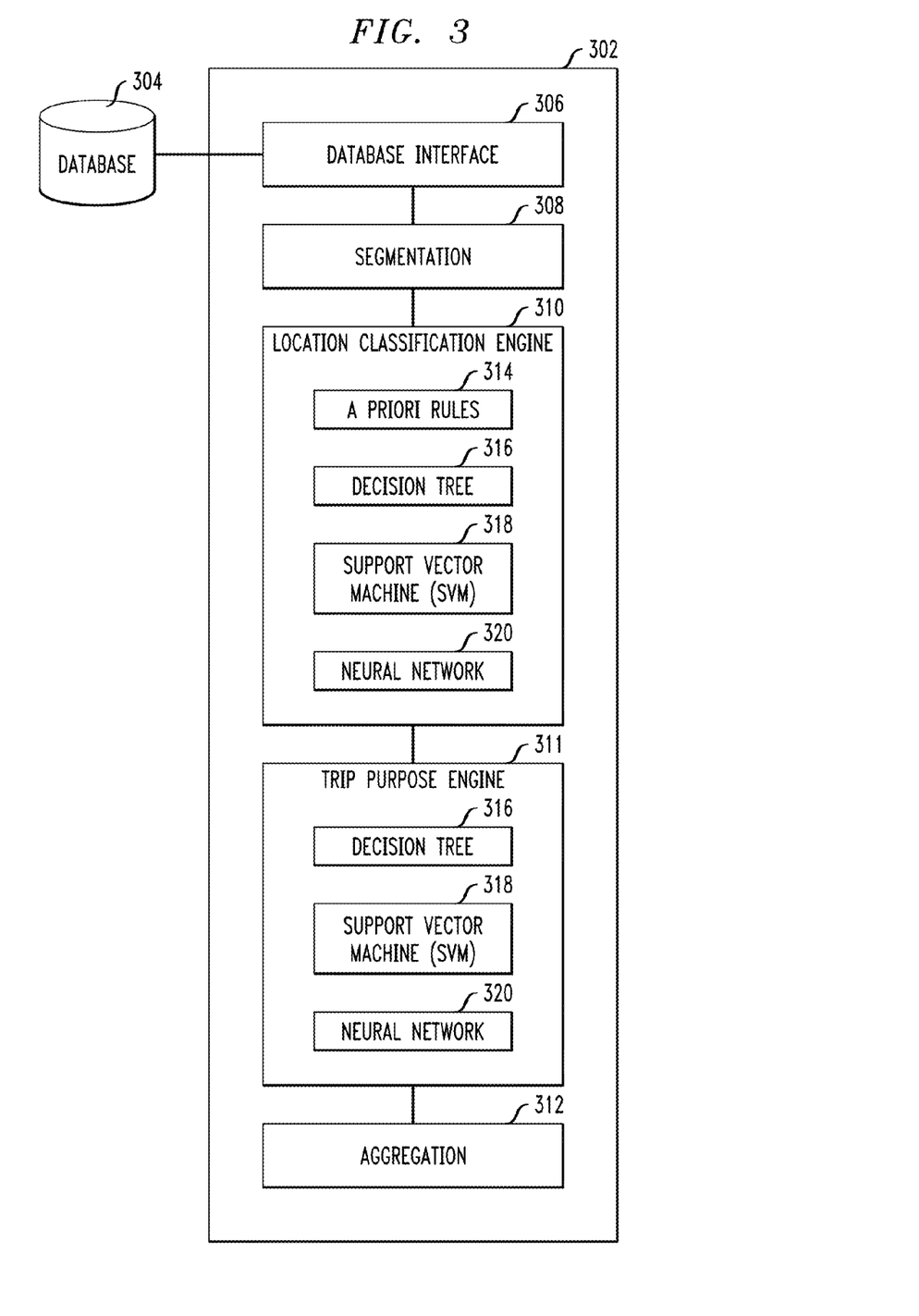
FIG. 3 is an exemplary software architecture diagram, according to an aspect of the invention.

FIG. 3 shows an exemplary software architecture 302. Database 304 stores a variety of data, such as the call data records 206 and points of interest 204, the purpose-based origin-destinations 218, as well as results of intermediate steps in the various calculations. Database interface 306 is used to read data from database 304, write data to database 304, and control access to data in database 304. Segmentation module 308 is used to implement segmenting step 208. Trip segmentation is based on duration of stay at each location as well as spatial and temporal separation between temporally adjacent CDR records. If the user stayed at a location for more than a certain amount of time, say one hour, take that as a separation point. If two temporally' adjacent CDR records are both a few hours apart and a few miles apart, take them as separation points too. Segmentation module 308 can be implemented, for example, by a software module written in a high-level language to implement the logic just described, stored in a non-transitory manner, and loaded into memory and executed by one or more processors.

Location classification engine 310 is used to implement step 210 via a variety of techniques; for example, one or more of a priori rules 314, decision tree techniques 316, support vector machine 318, and neural network 320. Trip purpose engine 311 is used to implement steps 212 and 214 via a variety of techniques; for example, one or more of decision tree techniques 316, support vector machine 318, and neural network 320. Location classification engine 310 and trip purpose engine 311 can be implemented, for example, by a software module written in a high-level language to implement the logic described, stored in a non-transitory manner, and loaded into memory and executed by one or more processors. The code for decision tree techniques 316, support vector machine 318, and neural network 320 could, for example, be shared by engines 310 and 311 and called as needed. In other cases, engines 310, 311 could have dedicated code segments for decision tree techniques, SVM, neural network approaches.

Aggregation module 312 carries out aggregation step 216. Aggregation module 312 aggregates ODs that are of the same type (HBW, NHBW, etc.) and happened at a similar time of day (morning, afternoon, night, etc.) together. Aggregation module 312 can be implemented, for example, by a software module written in a high-level language to implement the logic just described, stored in a non-transitory manner, and loaded into memory and executed by one or more processors.

Again, the modules and/or portions thereof may be custom written in, for example, a high-level programming language, or implemented by customizing a commercially available package such as MATLAB® software or the like (registered mark of The MathWorks, Inc., Natick, Mass., USA).

Given the discussion thus far, it will be appreciated that, in general terms, an exemplary method, according to an aspect of the invention, includes the step of obtaining access to call data records 206 for a plurality of mobile telephony users. In addition to or in lieu of the call data records, other data could be obtained, such as location update events and/or control events between mobile telephone infrastructure and mobile phones for a plurality of mobile telephony users. The call data records or other data include location-time sequences. The records or other data are anonymized and/or obtained from volunteers who have consented. This step can be carried out, for example, by database interface module 306 accessing data in database 304. The data may be loaded into the database in a variety of fashions; for example via a network feed from a mobile telephony company.

A further step 208 includes, for each of the mobile telephony users, segmenting corresponding ones of the location-time sequences into trips. This step can be carried out, for example, by segmentation module 308.

Another step 210 includes, for each of the mobile telephony users, using a home-work-school classification model to determine a home location and a work-school location, based on the trips. This step can be carried out, for example, by location classification engine module 310.

Still another step 212 includes, for each of the mobile telephony users, using a trip purpose classification model to assign each of the trips a purpose label, based at least on comparing at least one of a start location and an end location for each one of the trips to at least one of the home location and the work-school location determined using the homework-school classification model. This step can be carried out, for example, by trip purpose engine module 311.

An even further step 216 includes aggregating the trips into purpose based origin-destination categories 218 based at least on the purpose labels, time ranges of the location-time sequences, and the start and end locations. This step can be carried out, for example, by aggregation module 312.

Preferably, an additional step 214 includes revising those of the trip purpose labels having a low confidence score. The aggregating is based on the revised labels. This step can be carried out, for example, by trip purpose engine module 311.

In the obtaining step, the location-time sequences can be based on triangulated locations and/or nearest cell tower locations.

In some cases, the segmenting step 208 includes segmenting based on time duration of a mobile device of a given one of the mobile telephony users in a given area, and data for each of the trips is stored as start time, end time, start location, end duration, and stay duration.

In some cases, the using of the home-work-school classification model includes using a rule-based home-work-school classification model (e.g., 314) based on prior knowledge.

In one or more embodiments, the using of the home-work-school classification model includes training the home-work-school classification model based on labeled data from volunteers.

In some instances, the using of the home-work-school classification model includes using a decision tree home-work-school classification model (e.g., 316).

In some cases, the using of the home-work-school classification model includes using a support vector machine (SVM) home-work-school classification model (e.g., 318).

In some cases, the using of the home-work-school classification model includes using an artificial neural network home-work-school classification model (e.g., 320).

In one or more embodiments, the using of the trip purpose classification model includes using a rule-based trip purpose classification model based on at least one of prior knowledge and points of interest (e.g., 314).

In some instances, the using of the trip purpose classification model includes training the trip purpose classification model based on labeled trips.

In some cases, the using of the trip purpose classification model includes using a decision tree trip purpose classification model (e.g., 316).

In some cases, the using of the trip purpose classification model includes using a support vector machine (SVM) trip purpose classification model (e.g., 318).

In one or more embodiments, the using of the trip purpose classification model includes using an artificial neural network trip purpose classification model (e.g., 320). In one or more embodiments, the segmenting step 208 includes segmenting based on time duration of a mobile device of a given one of the mobile telephony users in a given area; data for each of the trips is stored as start time, end time, start location, end location, and stay duration; and the trip purpose classification model assigns each of the trips a purpose label further based on based at least on start time, end time, stay duration, and order of a given one of the trips during a day.

In some cases, the revising of the trip purpose labels includes iteratively revising the trip purpose labels with a refined model based on associations among the trip purposes. Again, techniques such as decision tree, SVM, and/or neural networks can be employed using modules such as 316, 318, and 320.

In one or more instances, the revising of the trip purpose labels in step 214 includes identifying for each of the trips additional attributes of previous purpose and next purpose.

In at least some cases, suitable actions are taken based on the results. For example, at least one bus is routed, and/or at least one road is plowed, based on the purpose based origin-destination categories.

Note that elements 314, 316, 318, 320 are referred to as modules, but may also be considered as sub-modules of the engines 310, 311 as shown in FIG. 3.

Furthermore, in some cases an additional step can include, for each of the mobile telephony users, classifying a mode of movement based on trip start, trip end, trip duration, location of origin, location of destination, type of origin, type of destination, and information from other sources such as available traffic information and/or meta data about telephone infrastructure collecting events.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code. etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
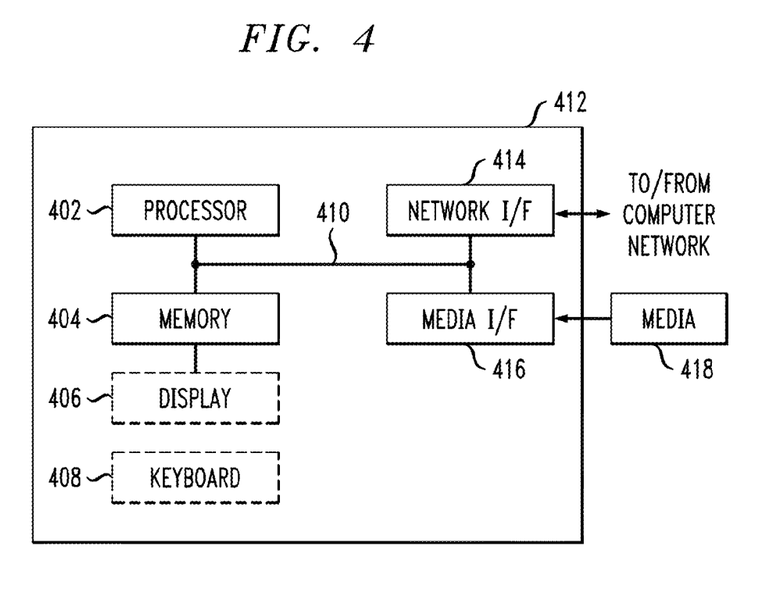
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a database interface module, a segmentation module, a location classification engine module, a trip purpose engine module, and an aggregation module. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining access to at least one of call data records, location update events, and control events between mobile telephone infrastructure and mobile phones for a plurality of mobile telephony users, said at least one of call data records, location update events, and control events between mobile telephone infrastructure and mobile phones comprising location-time sequences;
    for each of said mobile telephony users, segmenting corresponding ones of said location-time sequences into trips, each of said trips comprising a start location and an end location extracted from said location-time sequences upon said segmentation;
    for each of said mobile telephony users, using a home-work-school classification model to determine a home location and a work-school location, based on said trips;
    for each of said mobile telephony users, using a trip purpose classification model to assign each of said trips between the start location and the end location a purpose label indicative of the purpose of the trips, based at least on comparing at least one of the start location and the end location for each one of said trips to at least one of said home location and said work-school location determined using said home-work-school classification model; and
    aggregating said trips into purpose based origin-destination categories based at least on said purpose labels, time ranges of said location-time sequences, and said start and end locations.

2. The method of claim 1, further comprising revising those of said trip purpose labels having a low confidence score, wherein said aggregating is based on said revised labels.

3. The method of claim 2, wherein, in said obtaining step, said location-time sequences are based at least on triangulated locations.

4. The method of claim 2, wherein, in said obtaining step, said location-time sequences are based at least on nearest cell tower locations.

5. The method of claim 2, wherein said segmenting step comprises segmenting based on time duration of a mobile device of a given one of said mobile telephony users in a given area, and wherein data for each of said trips is stored as start time, end time, start location, end duration, and stay duration.

6. The method of claim 2, wherein said using of said home-work-school classification model comprises using a rule-based home-work-school classification model based on prior knowledge.

7. The method of claim 2, wherein said using of said home-work-school classification model comprises training said home-work-school classification model based on labeled data from volunteers.

8. The method of claim 2, wherein said using of said home-work-school classification model comprises using a decision tree home-work-school classification model.

9. The method of claim 2, wherein said using of said home-work-school classification model comprises using a support vector machine (SVM) home-work-school classification model.

10. The method of claim 2, wherein said using of said home-work-school classification model comprises using an artificial neural network home-work-school classification model.

11. The method of claim 2, wherein said using of said trip purpose classification model comprises using a rule-based trip purpose classification model based on at least one of prior knowledge and points of interest.

12. The method of claim 2, wherein said using of said trip purpose classification model comprises training said trip purpose classification model based on labeled trips.

13. The method of claim 2, wherein said using of said trip purpose classification model comprises using a decision tree trip purpose classification model.

14. The method of claim 2, wherein said using of said trip purpose classification model comprises using a support vector machine (SVM) trip purpose classification model.

15. The method of claim 2, wherein said using of said trip purpose classification model comprises using an artificial neural network trip purpose classification model.

16. The method of claim 2, wherein:
said segmenting step comprises segmenting based on time duration of a mobile device of a given one of said mobile telephony users in a given area;
data for each of said trips is stored as start time, end time, start location, end location, and stay duration; and
said trip purpose classification model assigns each of said trips a purpose label further based on based at least on start time, end time, stay duration, and order of a given one of said trips during a day.

17. The method of claim 2, wherein said revising of said trip purpose labels comprises iteratively revising said trip purpose labels with a refined model based on associations among said trip purposes.

18. The method of claim 17, wherein said revising of said trip purpose labels comprises identifying for each of said trips additional attributes of previous purpose and next purpose.

19. The method of claim 2, further comprising at least one of:
routing at least one bus based on said purpose based origin-destination categories: and
plowing at least one road based on said purpose based origin-destination categories.

20. The method of claim 2, further comprising providing a system, wherein the system comprises distinct software modules, each of the distinct software modules being embodied in a non-transitory manner on a computer-readable storage medium, and wherein the distinct software modules comprise a database interface module, a segmentation module, a location classification engine module, a trip purpose engine module, and an aggregation module;
wherein:
said obtaining of said access to said at least one of call data records, location update events, and control events between mobile telephone infrastructure and mobile phones is carried out by said database interface module executing on at least one hardware processor;
said segmenting of said corresponding ones of said location-time sequences into trips is carried out by said segmentation module executing on said at least one hardware processor;
said using of said home-work-school classification model to determine said home location and said work-school location is carried out by said location classification engine module executing on said at least one hardware processor;
said using of said trip purpose classification model is carried out by said trip purpose engine module executing on said at least one hardware processor;
said revising of said trip purpose labels is carried out by said trip purpose engine executing on said at least one hardware processor; and
said aggregating of said trips is carried out by said aggregation module executing on said at least one hardware processor.

21. The method of claim 1, further comprising, for each of said mobile telephony users, classifying a mode of movement based on trip start, trip end, trip duration, location of origin, location of destination, type of origin, type of destination, and information from other sources comprising at least one of available traffic information and meta data about telephone infrastructure collecting events.

22. A computer program product comprising a computer readable storage medium having computer readable program code embodied therewith in a non-transitory manner, said computer readable program code comprising:
computer readable program code configured to obtain access to at least one of call data records, location update events, and control events between mobile telephone infrastructure and mobile phones for a plurality of mobile telephony users, said at least one of call data records, location update events, and control events between mobile telephone infrastructure and mobile phones comprising location-time sequences;
computer readable program code configured to, for each of said mobile telephony users, segment corresponding ones of said location-time sequences into trips, each of said trips comprising a start location and an end location extracted from said location-time sequences upon said segmentation;
computer readable program code configured to, for each of said mobile telephony users, use a home-work-school classification model to determine a home location and a work-school location, based on said trips;
computer readable program code configured to, for each of said mobile telephony users, use a trip purpose classification model to assign each of said trips between the start location and the end location a purpose label indicative of the purpose of the trips, based at least on comparing at least one of the start location and the end location for each one of said trips to at least one of said home location and said work-school location determined using said home-work-school classification model; and
computer readable program code configured to aggregate said trips into purpose based origin-destination categories based at least on said purpose labels, time ranges of said location-time sequences, and said start and end locations.

23. An apparatus comprising:
a memory; and
at least one processor, coupled to said memory, and operative to:
obtain access to at least one of call data records, location update events, and control events between mobile telephone infrastructure and mobile phones for a plurality of mobile telephony users, said at least one of call data records, location update events, and control events between mobile telephone infrastructure and mobile phones comprising location-time sequences;
for each of said mobile telephony users, segment corresponding ones of said location-time sequences into trips, each of said trips comprising a start location and an end location extracted from said location-time sequences upon said segmentation;
for each of said mobile telephony users, use a home-work-school classification model to determine a home location and a work-school location, based on said trips;
for each of said mobile telephony users, use a trip purpose classification model to assign each of said trips between the start location and the end location a purpose label indicative of the purpose of the trips, based at least on comparing at least one of the start location and the end location for each one of said trips to at least one of said home location and said work-school location determined using said home-work-school classification model; and aggregate said trips into purpose based origin-destination categories based at least on said purpose labels, time ranges of said location-time sequences, and said start and end locations.

24. The apparatus of claim 23, further comprising a plurality of distinct software modules, each of the distinct software modules being embodied in a non-transitory manner on a computer-readable storage medium, and wherein the distinct software modules comprise a database interface module, a segmentation module, a location classification engine module, a trip purpose engine module, and an aggregation module;

wherein:

said at least one processor is operative to obtain said access to said at least one of call data records, location update events, and control events between mobile telephone infrastructure and mobile phones by executing said database interface module;

said at least one processor is operative to segment said corresponding ones of said location-time sequences into trips by executing said segmentation module;

said at least one processor is operative to use said home-work-school classification model to determine said home location and said work-school location by executing said location classification engine module;

said at least one processor is operative to use said trip purpose classification model by executing said trip purpose engine module;

said at least one processor is operative to revise said trip purpose labels by executing said trip purpose engine module; and said at least one processor is operative to aggregate said trips by executing said aggregation module.

25. An apparatus comprising:

means for obtaining access to at least one of call data records, location update events, and control events between mobile telephone infrastructure and mobile phones for a plurality of mobile telephony users, said at least one of call data records, location update events, and control events between mobile telephone infrastructure and mobile phones comprising location-time sequences;

means for, for each of said mobile telephony users, segmenting corresponding ones of said location-time sequences into trips, each of said trips comprising a start location and an end location extracted from said location-time sequences upon said segmentation;

means for, for each of said mobile telephony users, using a home-work-school classification model to determine a home location and a work-school location, based on said trips;

means for, for each of said mobile telephony users, using a trip purpose classification model to assign each of said trips between the start location and the end location a purpose label indicative of the purpose of the trips, based at least on comparing at least one of the start location and the end location for each one of said trips to at least one of said home location and said work-school location determined using said home-work-school classification model; and means for aggregating said trips into purpose based origin-destination categories based at least on said purpose labels, time ranges of said location-time sequences, and said start and end locations.

* * * * *